(12) United States Patent
Kang et al.

(10) Patent No.: US 7,725,140 B2
(45) Date of Patent: May 25, 2010

(54) PORTABLE TERMINAL

(75) Inventors: Yeong Taek Kang, Seoul (KR); Jae Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 741 days.

(21) Appl. No.: 11/394,196

(22) Filed: Mar. 31, 2006

(65) Prior Publication Data
US 2006/0222174 A1   Oct. 5, 2006

(30) Foreign Application Priority Data
Mar. 31, 2005   (KR) ................... 10-2005-0027246
Mar. 31, 2005   (KR) ................... 10-2005-0027247

(51) Int. Cl.
*H04B 1/38*   (2006.01)
*H04M 1/00*   (2006.01)

(52) U.S. Cl. ................. 455/575.1; 455/90.3; 455/575.3

(58) Field of Classification Search ................. 455/558, 455/566, 575.1, 575.3, 575.4, 90.3; 379/433.06–433.07
See application file for complete search history.

(56) References Cited

U.S. PATENT DOCUMENTS

| | | | |
|---|---|---|---|
| 7,023,421 B2* | 4/2006 | Wong et al. | 345/156 |
| 7,159,833 B2* | 1/2007 | Kato | 248/349.1 |
| 7,181,251 B2* | 2/2007 | Stohr et al. | 455/566 |
| 7,184,802 B2* | 2/2007 | Chadha | 455/575.1 |
| 7,200,429 B2* | 4/2007 | Park et al. | 455/575.4 |
| 7,240,836 B2* | 7/2007 | Vrotsos et al. | 235/439 |
| 2004/0227733 A1 | 11/2004 | Fyke | |
| 2004/0233173 A1 | 11/2004 | Bryant | |
| 2005/0054393 A1* | 3/2005 | Fagerstrom et al. | 455/575.1 |
| 2005/0272488 A1* | 12/2005 | Zou | 455/575.4 |

FOREIGN PATENT DOCUMENTS

| | | |
|---|---|---|
| EP | 0 522 762 | 1/1993 |
| EP | 1 367 804 | 12/2003 |
| KR | 10-2002-0088116 A | 11/2002 |
| KR | 10-2004-0095142 A | 11/2004 |
| WO | WO 03/021919 | 3/2003 |

OTHER PUBLICATIONS

European Search Report dated Sep. 2, 2009.

* cited by examiner

*Primary Examiner*—Simon D Nguyen
(74) *Attorney, Agent, or Firm*—KED & Associates, LLP (57) ABSTRACT

The present invention relates to a portable terminal. The portable terminal of the present invention comprises a main body unit 10, a display unit 20 which is connected and installed to the main body unit 10 and provided with a display screen 22 for displaying a variety of information, and a key pad 32 which includes a plurality of keys 34 arranged in rows thereon and is installed to the main body unit to be rotatable by a predetermined angle. According to the present invention, since the arrangement of keys is changed according to modes of the portable terminal, there is an advantage in that a user can conveniently use the keys. In particular, since the arrangement of keys on the key pad with respect to the display unit is similar to that of a computer keyboard in a specified mode of the portable terminal, there is another advantage in that the user can quickly perform a key input operation. Further, since characters indicated on the keys can be changed according to the rotational position of the key pad, there is a further advantage in that the keys can be easily distinguished from one another.

13 Claims, 11 Drawing Sheets

PORTABLE TERMINAL

BACKGROUND OF THE INVENTION

1. Field of Invention

The present invention relates to a portable terminal, and more particularly, to a portable terminal capable of using mobile communication, connecting with the Internet, and making a simple document while a user carries the portable terminal.

2. Description of the Prior Art

Recently, a terminal capable of using mobile communication has been a necessary device, and it has been also possible to connect with the Internet and make a simple document using the terminal. That is, a portable terminal with functions as high as those of a computer used several years ago has been released onto the market. As the portable terminal has its diverse functions, a key input operation is essential even for a portable terminal.

In conventional portable terminals, however, most keys are fixedly installed to a main body unit. In general, a main body unit of a portable terminal is configured in such a manner that its vertical length is greater than its horizontal width. Thus, when the keys are arranged, the number of keys arranged in a width direction of the main body unit is smaller than the number of keys arranged in a longitudinal direction of the main body unit.

However, a user is generally accustomed to a key input operation using a computer keyboard. That is, the computer keyboard is configured in such a manner that the number of keys arranged in the width direction is greater that the number of keys arranged in the length direction. Thus, in a state where both hands are placed on the keyboard, a user operates the keys arranged in the left half portion of the keyboard with the left hand and the keys arranged in the right half portion of the keyboard with the right hand.

Therefore, it is very awkward and slow to perform the key input operation in a portable terminal in which the number of keys arranged in a length direction is greater than the number of keys arranged in a width direction and the keys are fixedly installed to the main body unit.

In order to solve the problems in a prior art, there is suggested a portable terminal capable of performing a key input operation in a state where a main body unit itself has been rotated by 90 degrees. However, since a display unit also rotates by 90 degrees as the main body unit rotates by 90 degrees, there is a problem in that it is difficult to view the input contents well.

Further, in the prior art, an additional memory card can be used for storing a file with a relatively large file size created through the key input operation. The memory card is generally inserted into a card slot opened to the outside at an outer surface of a main body unit of a portable terminal. However, since the card slot is exposed to the outer surface of the main body unit of the portable terminal, there is another problem in that there is a relatively high risk of losing the memory card.

SUMMARY OF THE INVENTION

Accordingly, the present invention is conceived to solve the aforementioned problems in the prior art. An object of the present invention is to provide a portable terminal capable of changing a key arrangement according to the modes of the portable terminal.

Another object of the present invention is to provide a portable terminal in which a key pad can be rotated by a predetermined angle with respect to a main body unit.

A further object of the present invention is to provide a portable terminal capable of changing characters indicated on keys according to rotational positions of a key pad.

A still further object of the present invention is to provide a portable terminal which enables a slot for inserting a memory card to be selectively exposed to the outside.

A still further object of the present invention is to provide a portable terminal which enables a slot for inserting a memory card to be selectively exposed to the outside by rotating a key pad by a predetermined angle with respect to a main body unit.

According to an aspect of the present invention for achieving the objects, there is provided a portable terminal, comprising: a main body unit; a display unit connected and installed to the main body unit and provided with a display screen for displaying a variety of information; and a key pad including a plurality of keys arranged in rows thereon and being installed to the main body unit to be rotatable by a predetermined angle.

The key pad is installed on an upper surface of the main body unit through a pad hinge to be rotatable by about 90 degrees relative to the main body unit in at least one direction.

The pad hinge comprises: a first hinge body having a mounting piece mounted to any one of the main body unit and the key pad; a second hinge body having a mounting flange mounted to the other one of the main body unit and the key pad to which the first hinge body is not mounted, the second hinge body being rotatable relative to the first hinge body; and a through-hole bored through the center of the first or second hinge body to allow a cable to pass through the through-hole.

The information inputted by the keys is switched by a signal provided from a sensor for detecting a rotational position of the key pad relative to the main body unit.

The key pad is positioned between the display unit and the main body unit when the display unit is folded on the main body unit.

Characters, numerals and symbols are indicated on the keys using holograms.

Surfaces of the keys are inclined in one direction.

The characters, numerals and symbols are indicated on the keys such that their upper ends are directed toward a lower side of the display screen of the display unit.

A curved step portion with a curvature corresponding to a rotating radius of the key pad is formed to protrude on an upper surface of the main body unit, an end of the key pad is curved with a curvature corresponding to the curved step portion, and an upper surface of the curved step portion is substantially flush with an upper surface of the key pad.

According to other aspect of the present invention for achieving the objects, there is provided a portable terminal, comprising: a main body unit; a display unit connected and installed to the main body unit and provided with a display screen for displaying a variety of information; a key pad including a plurality of keys arranged in rows thereon and being installed to the main body unit to be rotatable by a predetermined angle; and a card slot formed in a side of the key pad to receive a memory card therein and exposed selectively to the outside according to a degree of rotation of the key pad.

A curved step portion with a curvature corresponding to a rotating radius of the key pad is formed to protrude on an upper surface of the main body unit, an end of the key pad is curved with a curvature corresponding to the curved step portion, and the card slot is formed at a position facing the curved step portion when the key pad is not rotated with respect to the main body unit.

An SD card is mounted into the card slot.

The key pad is installed on an upper surface of the main body unit to be rotatable by about 90 degrees relative to the main body unit in at least one direction.

The key pad is positioned between the display unit and the main body unit when the display unit is folded on the main body unit.

Characters, numerals and symbols are indicated on the keys using holograms.

Surfaces of the keys are inclined in one direction.

The characters, numerals and symbols are indicated on the keys such that their upper ends are directed toward a lower side of the display screen of the display unit.

BRIEF DESCRIPTION OF THE DRAWINGS

The above and other objects, features and advantages of the present invention will become apparent from the following description of preferred embodiments given in conjunction with the accompanying drawings, in which:

FIG. 6a is a plan view of a key of the embodiment shown in FIG. 5a;

FIG. 6b is a sectional view taken along line A-A' of FIG. 6a;

FIG. 6c is a sectional view taken along line B-B' of FIG. 6a;

DETAILED DESCRIPTION OF THE PREFERRED EMBODIMENT

Hereinafter, preferred embodiments of a portable terminal according to the present invention will be described in detail with reference to the accompanying drawings.

Figure 1:
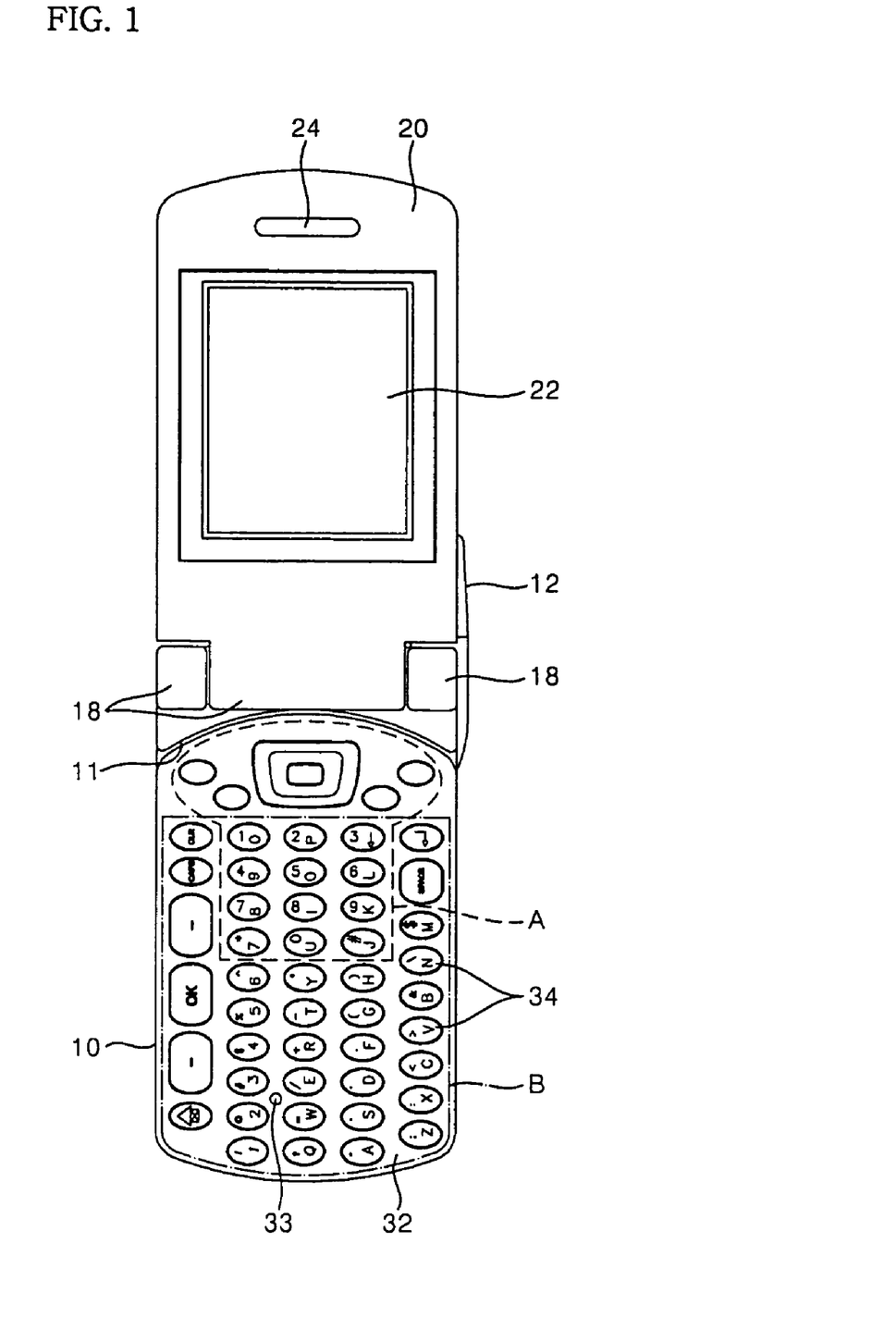
FIG. 1 is a plan view showing a preferred embodiment of a portable terminal according to the present invention.
Figure 2:
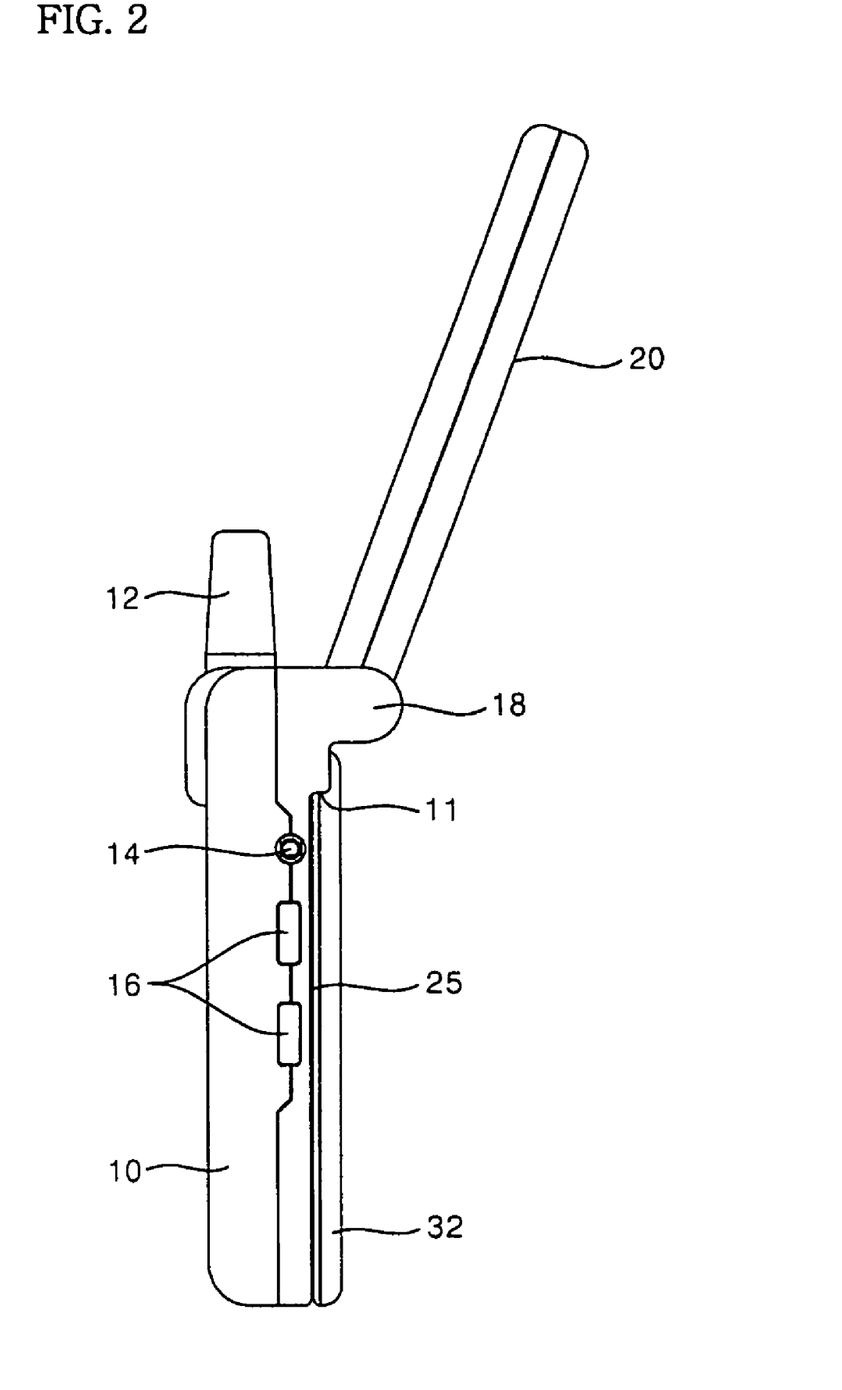
FIG. 2 is a side view showing the embodiment according to the present invention.
Figure 3:
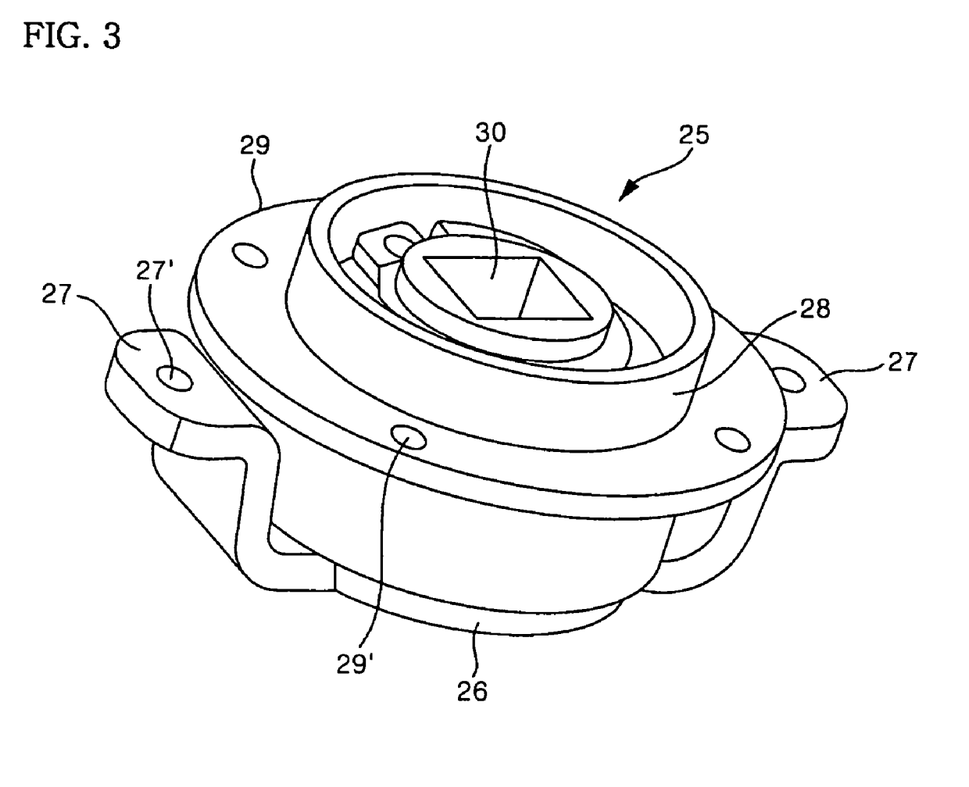
FIG. 3 is a perspective view showing a rotary hinge of the embodiment according to the present invention.
Figure 4:
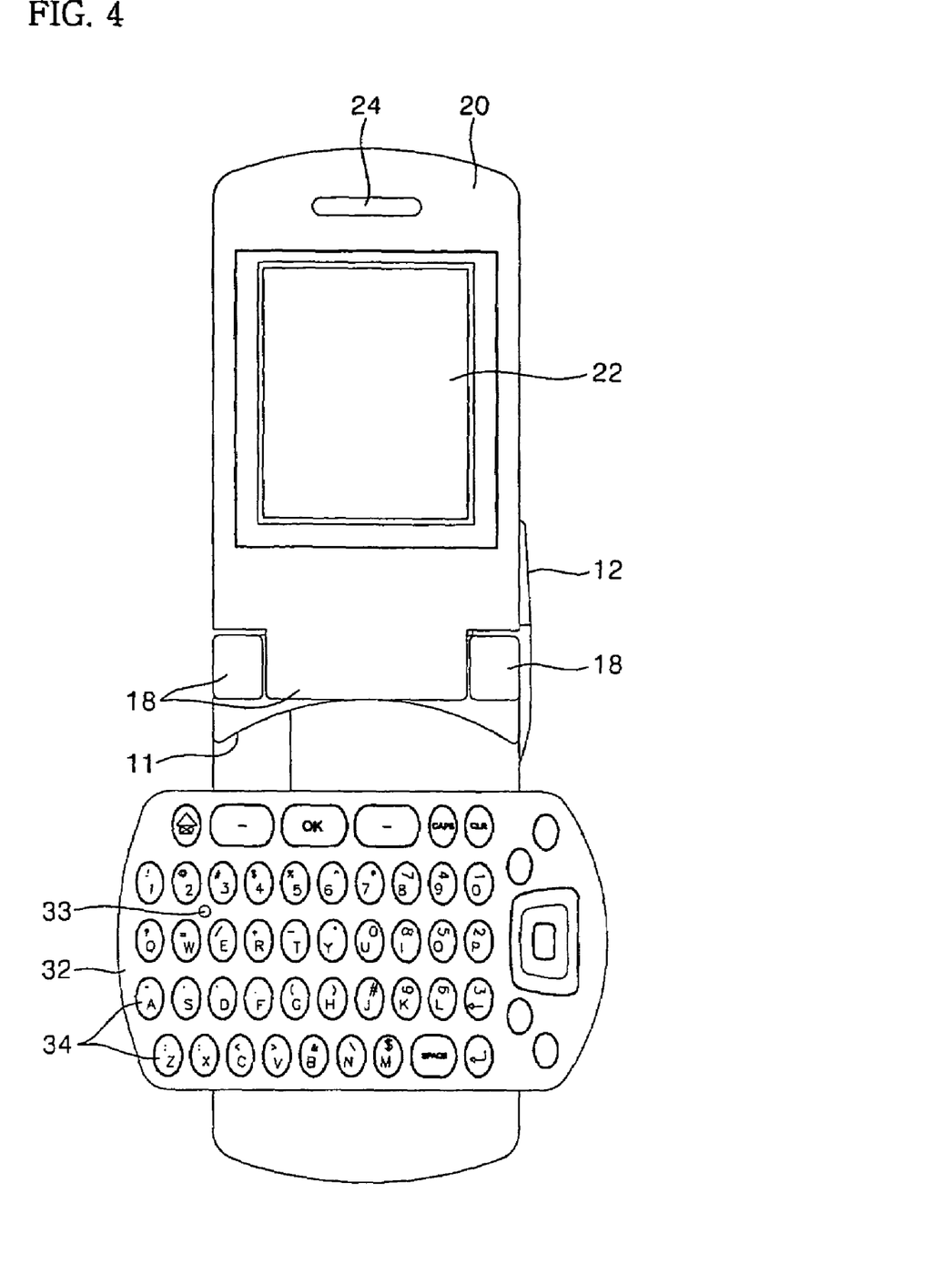
FIG. 4 is a plan view showing a state where a key pad is rotated in the embodiment according to the present invention.

FIG. 1 is a plan view showing a preferred embodiment of a portable terminal according to the present invention; FIG. 2 is a side view showing the embodiment according to the present invention; FIG. 3 is a perspective view showing a rotary hinge of the embodiment according to the present invention; and FIG. 4 shows a state where a key pad is rotated in the embodiment according to the present invention.

Referring to the figures, the portable terminal of the embodiment according to the present invention includes a main body unit 10 formed into a substantially thin box shape. The main body unit 10 is provided with a variety of parts including a main board and generally equipped with a battery.

A curved step portion 11 is formed on an upper end of an upper surface of the main body unit 10 as viewed in the figures. The curved step portion 11 that is formed to protrude on the upper surface of the main body unit 10 has a side wall, i.e. a portion facing a key pad 34 to be described below, which is formed to be curved with a predetermined curvature. It is preferred that upper surfaces of the curved step portion 11 and the key pad 32 be substantially flush with each other.

An antenna 12 for transmitting and receiving signals is provided at a certain position of an upper end of the main body unit 10. A connection jack 14 for signal connection with the outside device is installed in a side surface of the main body unit 10 to be exposed to the outside. For example, the connection jack 14 is to connect with an earphone. Buttons 16 for inputting information are also provided on an outer side surface of the main body unit 10. Any one of functions of the buttons 16 is to control volume of a speaker 24 to be described below. However, the configuration of the main body unit 10 is not necessarily limited to that illustrated in the figures.

Referring to the figures, a display unit 20 is connected to the upper end of the main body unit 10 through hinge portions 18. The display unit 20 is folded on the main body unit 10 about the hinge portions 18 or unfolded from the main body unit at a predetermined inclined angle as shown in FIGS. 1 and 2. The display unit 20 is also formed into a substantially thin box shape corresponding to that of the main body unit 10.

The display unit 20 is provided with a display screen 22. A liquid crystal panel is used as the display screen 22, but it is not necessarily so. That is, a variety of display devices such as an organic light emitting diode may be used. A liquid crystal panel with a size of about 2.2 to 2.3 inches is used. Reference numeral 24 designates the speaker.

Next, a key pad 32 is rotatably mounted on the upper surface of the main body unit 10 through a pad hinge 25. The configuration of the pad hinge 25 is well shown in FIG. 3. The pad hinge 25 includes a first hinge body 26. The first hinge body 26 is substantially formed into a cylindrical shape and provided with mounting pieces 27 on at least both ends thereof. A mounting hole 27' is bored through the mounting piece 27. The mounting pieces 27, which are mounted to the main body unit 10, are stepwise bent to be in accordance with the configuration of the main body unit 10.

A second hinge body 28 is formed into a substantially cylindrical shape and configured such that the first hinge body 26 can be relatively rotated in the second hinge body 28. That is, the first and second hinge bodies 26 and 28 rotate relative to each other. Here, it is preferred that the angle of the relative rotation between the first hinge body 26 and the second hinge body 28 be 90 degrees and they rotate relative to each other only in a specific direction. However, under a specific design condition, the rotational direction may be changed according to the modes of the portable terminal.

The second hinge body 28 is provided with a mounting flange 29 around an outer peripheral surface thereof. The mounting flange 29 is formed to protrude from the outer peripheral surface of the second hinge body 28 by a predetermined width. The mounting flange 29 is also formed with a plurality of mounting holes 29'. The mounting flange 29 is mounted to the key pad 32 to be described below.

A through-hole 30 is bored through the center of the pad hinge 25. Cables such as flexible printed circuit cables (FPC cables) for electrically connecting the main body unit 10 and the key pad 32 pass through the through-hole 30. For example, the through-hole 30 is bored either through the first hinge body 26 in a case where the first hinge body 26 is positioned in the second hinge body 28 or through the second hinge body 28 in a case where the second hinge body is positioned in the first hinge body.

The key pad 32 is rotatably mounted on the upper surface of the main body unit 10 through the pad hinge 25. That is, as the second hinge body 28 mounted to the key pad 32 rotates relative to the first hinge body 26, the key pad 32 does also rotate relative to the main body unit 10. Here, the key pad 32 is positioned between the main body unit 10 and the display unit 20 when the display unit 20 is folded on the main body unit 10.

A portion of the key pad 32 corresponding to the curved step portion 11 in a normal mode is formed into a curved surface with a curvature corresponding to the curved step portion 11. By forming the portion of the key pad 32 into the curved surface, the key pad 32 can smoothly rotate with respect to the curved step portion 11 of the main body unit 10 and an external appearance thereof can also be clean and neat.

A microphone 33 is provided on a certain position of the key pad 32. The microphone 33 receives sound such as a user's voice and also functions as a transmitter, particularly when the portable terminal is used in a mobile communication mode.

A plurality of keys 34 are arranged on the key pad 32. A user can input information by pressing the keys 34. The two arrangements of the keys 34 correspond, respectively, to when the key pad 32 is installed on the upper surface of the main body unit 10 in parallel with the main body unit 10 as shown in FIG. 1 (hereinafter, referred to as a "normal mode") and to when the key pad 32 is positioned in a rotated state with respect to the main body unit 10 as shown in FIG. 4 (hereinafter, referred to as a "rotational mode").

That is, the keys 34 arranged in a range A indicated by a dotted line are generally used in the normal mode, whereas the keys 34 arranged in a range B are generally used in the rotational mode. Of course, there are some keys commonly included in both the ranges A and B, for example, the keys 34 such as "1", "2", "3", "4", "5", "6", "7", "8", "9", "*", "0", and "#". The keys 34 are used to input "1", "2", "3", "4", "5", "6", "7", "8", "9", "*", "0", and "#" in the normal mode but to input "0", "P", "↓", "9", "O", "L", "8", "I", "K", "7", "U", and "J" in the rotational mode. That is, the numerals, characters, and symbols to be inputted become ones indicated on the respective keys 34 in an upright state when the user views the key pad 32 in the normal mode and in the rotational mode. For reference, the switching of the functions of the keys 34 in the normal mode and in the rotational mode is performed according to a signal provided from a sensor (not shown) for detecting a degree of the rotation of the key pad 32 with respect to the main body unit 10. The sensor may be installed in the pad hinge 25, or in a position in which the main body unit 10 and the key pad 32 correspond to each other.

Figure 5A:
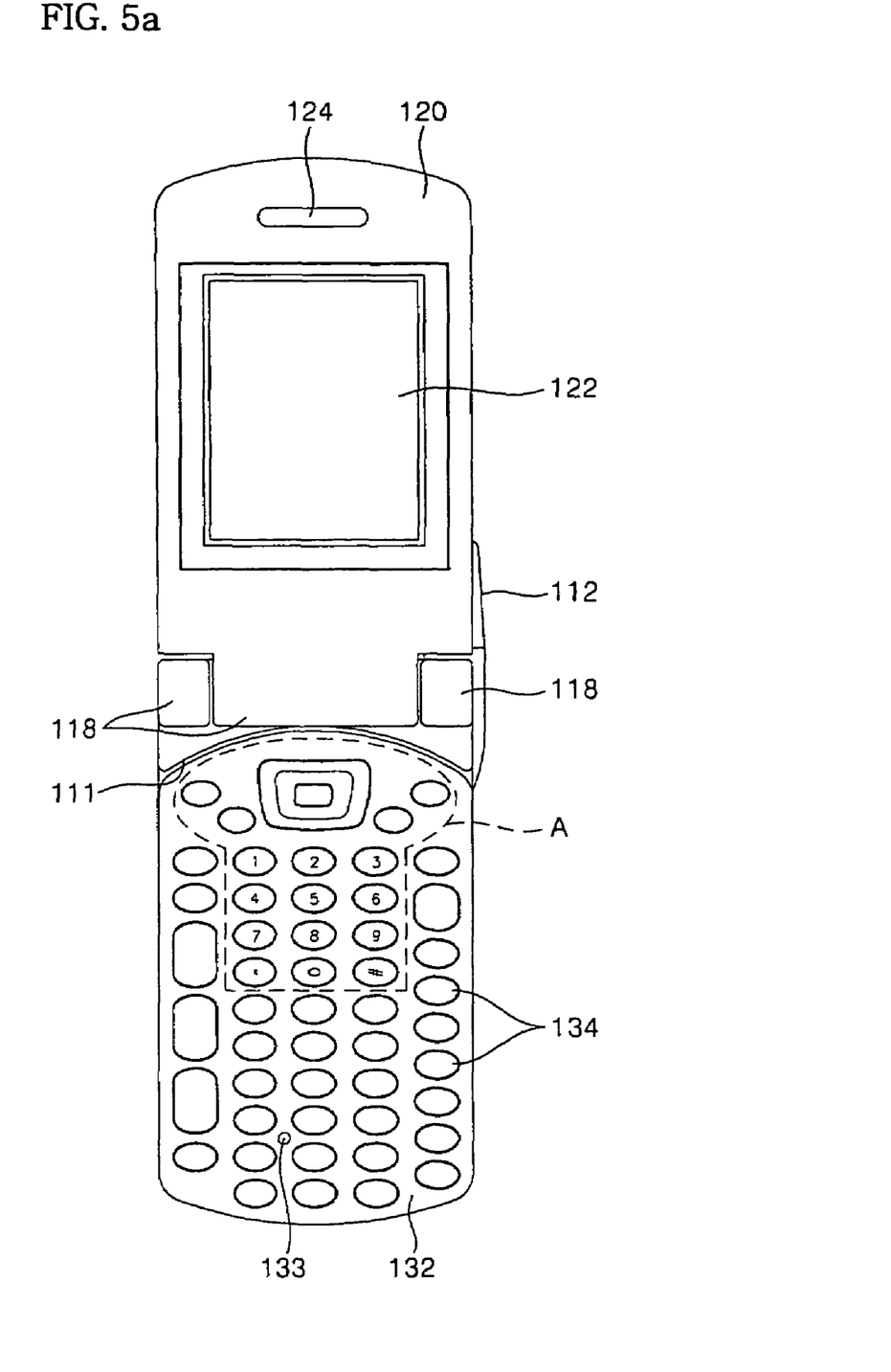
FIGS. 5a and 5b are plan views of another embodiment according to the present invention.

Furthermore, referring to FIGS. 5 and 6, another embodiment of the present invention will be described. In the present embodiment, reference numerals increased by one hundred are given to the components corresponding to those of the previous embodiment.

In the present embodiment, the numerals, characters, and symbols of keys 134 arranged on a key pad 132 are indicated to be different from each other in the normal and rotational modes. To this end, a hologram is used to indicate the numerals, characters, and symbols on the keys. That is, the numerals, characters, and symbols indicated on the keys 134 are viewed either as shown in FIG. 5a in the normal mode or as shown in FIG. 5b in the rotational mode.

In general, a hologram causes its figure to be changed according to the viewing angle of a user. To this end, a configuration as shown in FIGS. 6a to 6c may be employed in the present embodiment. Since a direction in which the user views the keys 134 is changed as the key pad 132 itself is rotated, it enables the numerals, characters, and symbols to be viewed different from each other.

However, it is possible for the desired numerals, characters, and symbols to be viewed by inclining surfaces of the keys 134 in one direction. That is, the surfaces of the keys 134 shown as a plan view in FIG. 6a are inclined from an upper end to a lower end as viewed in this figure. The numerals, characters, and symbols are indicated on the inclined surfaces using a hologram.

Figure 6A:
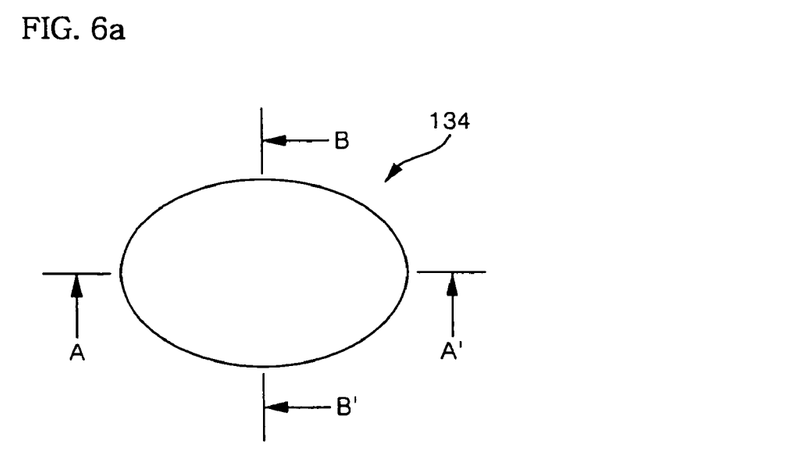
Figure 6B:
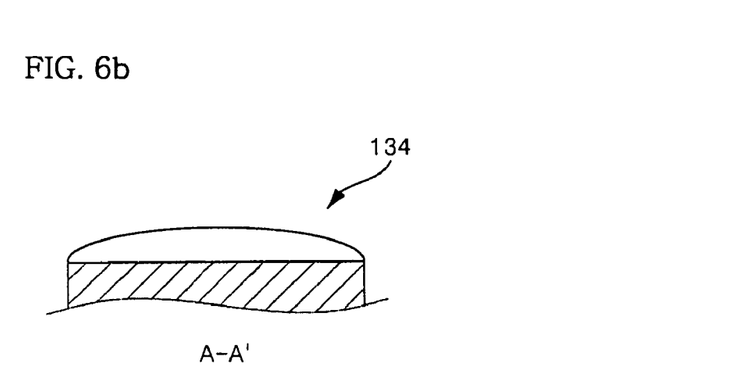
Figure 6C:
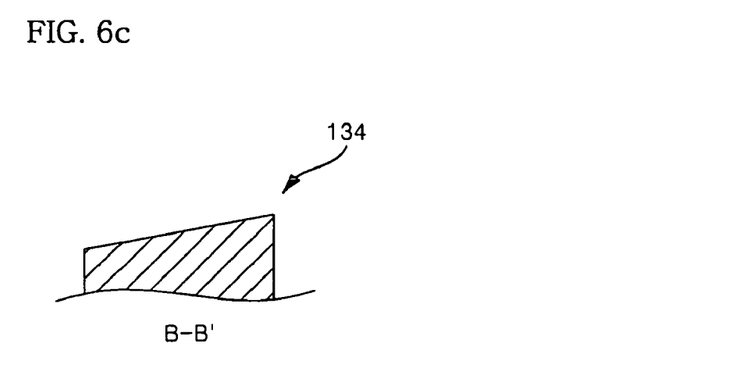

FIG. 6b is a sectional view of the key 134 cut in a horizontal direction in FIG. 6a, i.e. taken along line A-A' of FIG. 6a, while FIG. 6c is a sectional view of the key 134 cut in a vertical direction in FIG. 6a, i.e. taken along line B-B' of FIG. 6a. It can be understood from the sectional views that the upper end of the key 134 is relatively higher than the lower end thereof as viewed in FIG. 6a. Of course, the inclination of the surface of the key 134 is not necessarily limited thereto. If the numerals, characters, and symbols are indicated on the keys 134 selectively in the normal and rotational modes, the inclined direction thereof may be different from that shown in the figures.

In addition, in the present embodiment, the numerals, characters, and symbols indicated on the keys 134 are oriented to be always upright, as viewed by the user. That is, upper ends of the numerals, characters, and symbols are directed toward a lower side of the display screen of a display unit 120. In other words, the numerals, characters, and symbols for each of the keys 134 are indicated to be rotated by 90 degrees according to the modes of the portable terminal.

Next, referring to FIGS. 7 to 10, a further embodiment of the present invention will be described. For reference, in the present embodiment, reference numerals increased by two hundred are given to the components corresponding to those in the previous embodiment shown in FIG. 1. For convenience of description, only different features will be described herein.

Figure 7:
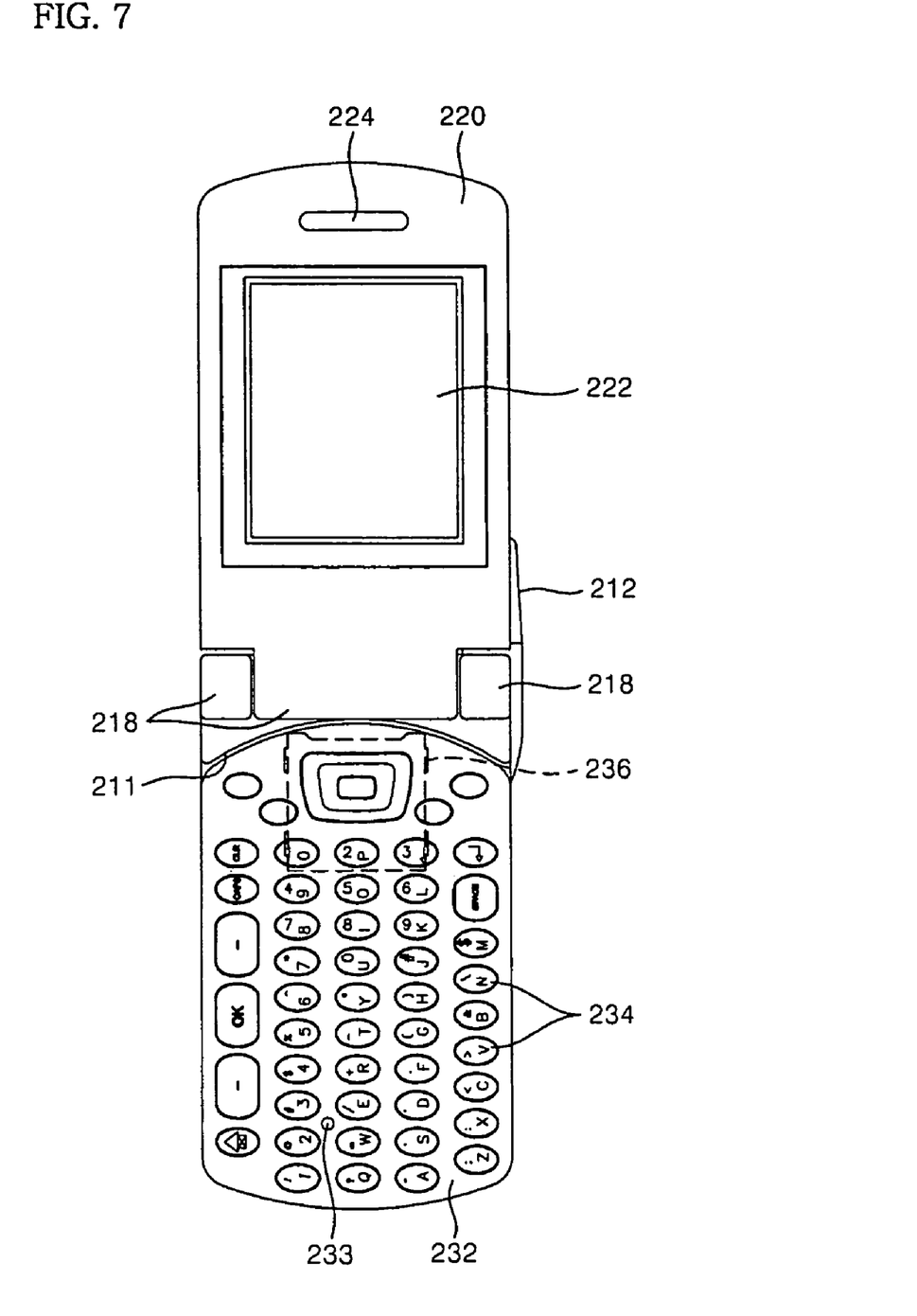
FIG. 7 is a plan view showing a further embodiment of the present invention.
Figure 8:
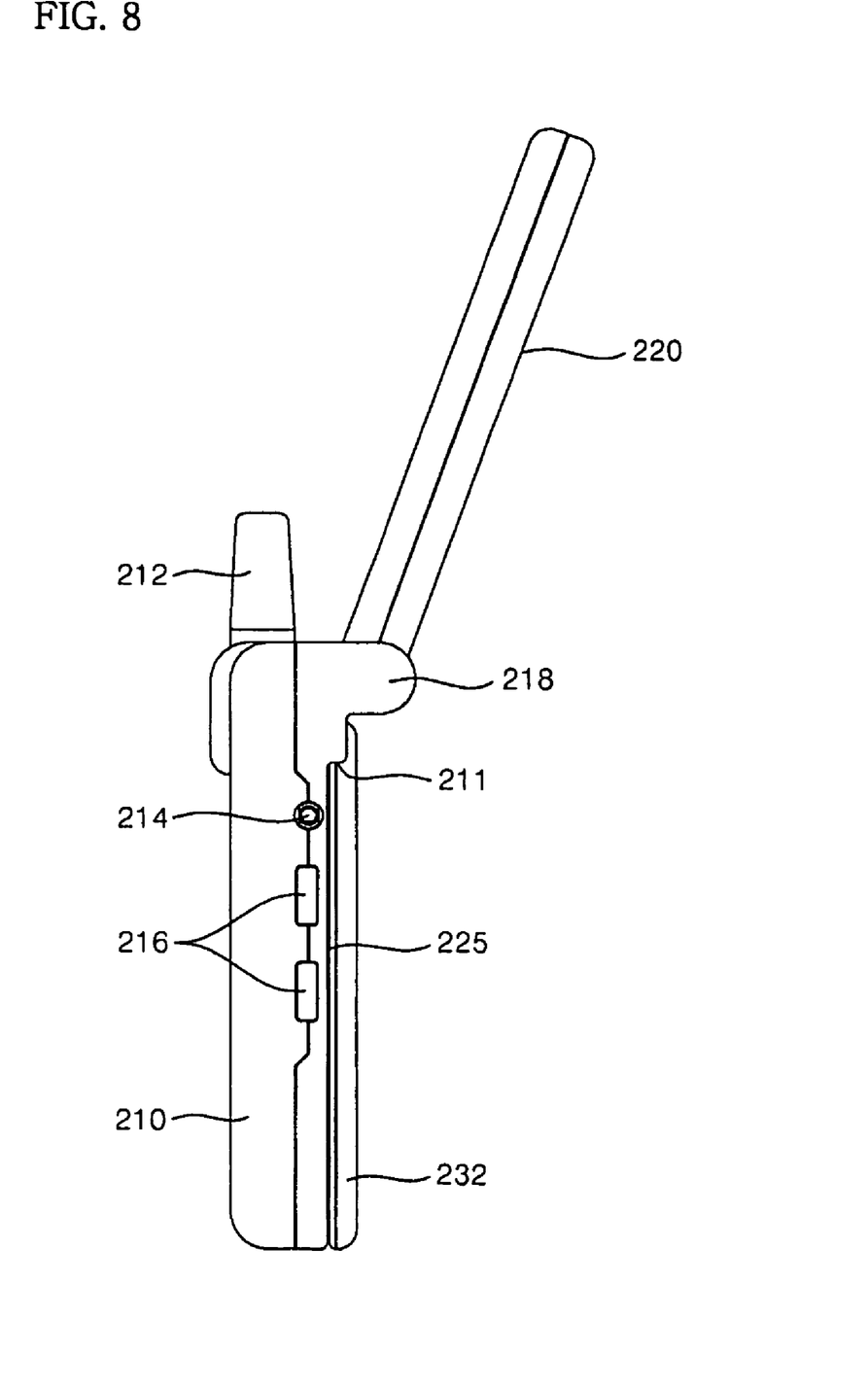
FIG. 8 is a side view of the embodiment shown in FIG. 7.

A key pad 232 is provided on a main body unit 210 to which a display unit 220 is connected and installed. The key pad 232 is installed on an upper surface of the main body unit 210 such that the former can be rotated with relative to the latter. The key pad 232 can be rotated relative to the main body unit 210 through a pad hinge 225.

Figure 9:
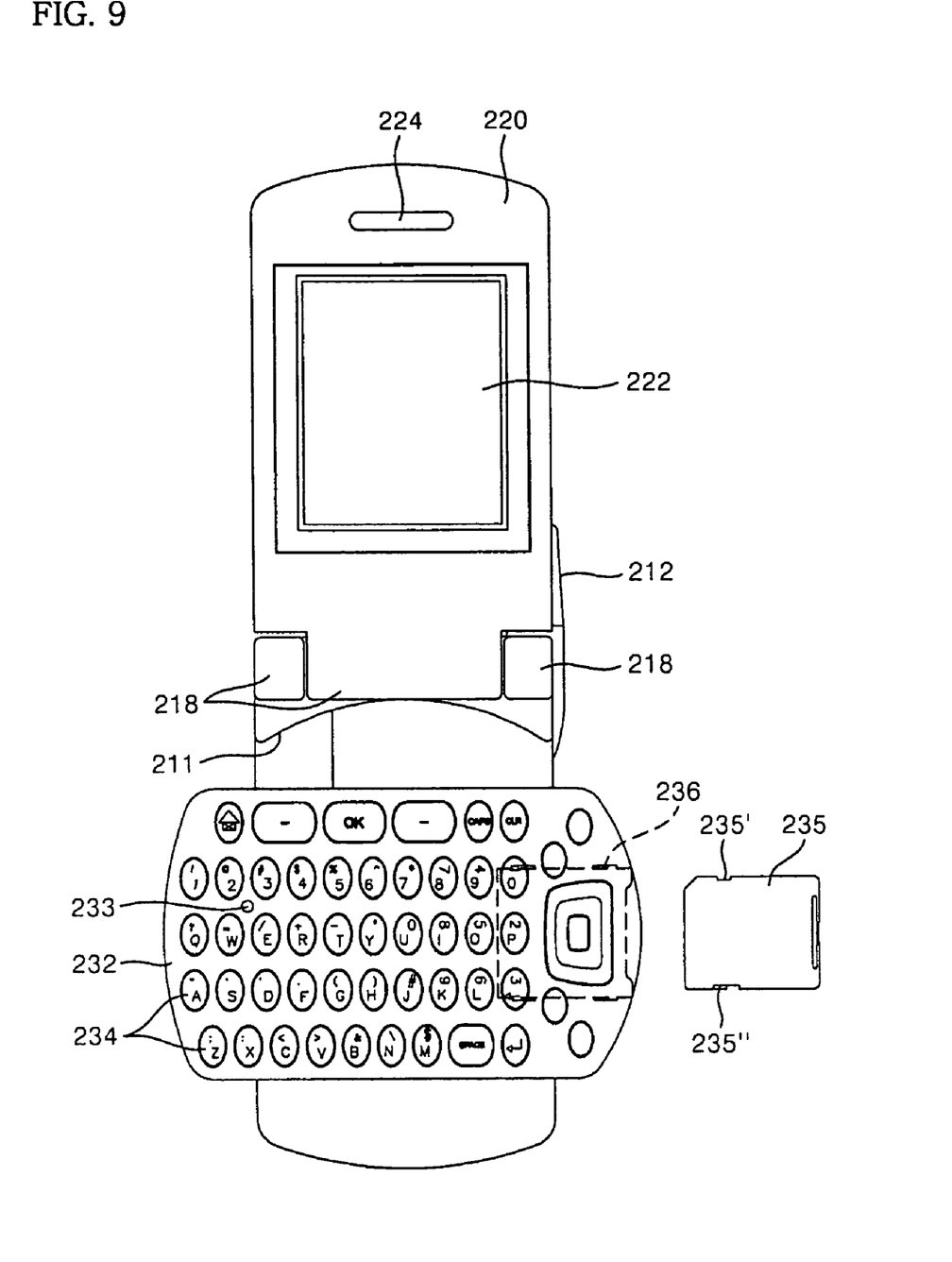
FIG. 9 is a plan view showing a state where a key pad is rotated in the embodiment shown in FIG. 7.

The key pad 232 is formed with a card slot 236 at a portion where the key pad 232 faces a curved step portion 211 of the main body unit 210 in a normal mode, and a memory card 235 is inserted into the card slot 236. A relatively light, thin, short and compact SD card is used as the memory card 235. As shown in FIG. 9, the memory card 235 is formed with a catching groove 235' at one side thereof and a write protection knob 235" at the other side thereof.

In the present embodiment, the card slot 236 is formed at the central upper end of the key pad 232 facing the curved step portion 211 in the normal mode, but it is not necessarily so. That is, the card slot 236 may be formed at any portion of the key pad 232 facing the curved step portion 211.

Figure 10:
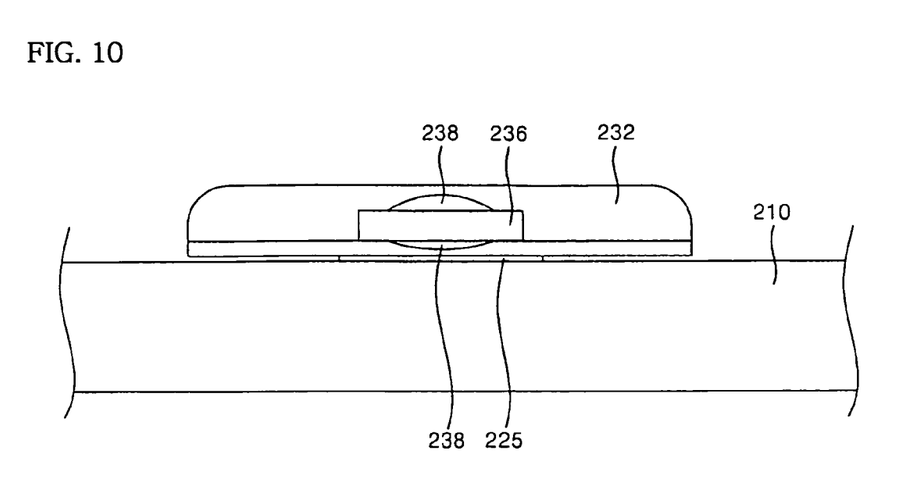
FIG. 10 is a side view showing that a slot for inserting a memory card therein is formed in the key pad in the embodiment shown in FIG. 7.

As shown in FIG. 10, recessed portions 238 are formed at opposite sides of an opening of the card slot 236. The recessed portions 238 are necessary to unload the memory card 235 from the card slot 236 by easily pressing the memory card with user's fingers. For reference, a configuration for mounting and fixing the memory card 235 is further provided in the card slot 236. That is, a catching mechanism (not shown) a side of which is caught to the catching groove 235' when the memory card 235 is pushed into the card slot 236 is provided within the card slot 236. The catching mechanism is configured in such a manner that the memory card 235 is locked when pressed once and unlocked to allow a portion thereof to protrude out of the card slot 236 when pressed once more.

Hereinafter, the operation of the portable terminal according to the present invention so configured will be described in detail.

Referring first to the embodiment shown in FIG. 1, it is explained how to use the key pad 32 of the portable terminal according to the present invention in the normal mode. Here, the normal mode corresponds to a state where the key pad 32 overlaps the main body unit 10 as shown in FIG. 1. That is, it corresponds to a state where the key pad 32 is not rotated about the pad hinge 25 with respect to the main body unit 10.

In such a case, the keys 34 arranged in the range A are mainly used. It is possible to input a variety of numerals, characters, and symbols using the keys 34. An example of the normal mode includes a mobile communication mode.

In the meantime, FIG. 4 shows a state where the key pad 32 has been rotated by 90 degrees about the pad hinge 25, i.e. the rotational mode. In such a rotational mode, the keys 34 arranged in the range B are mainly used. Using the keys 34, a variety of numerals, characters, and symbols can be inputted. An example of the rotational mode includes a case where a number of the keys 34 are used, i.e. when making a document or playing the game.

Particularly, in such a rotational mode, since the keys 34 are arranged on the key pad 32 to extend in a right and left direction similar to a computer keyboard, it is possible to perform a key input operation using both hands. Thus, since it is possible to perform the key input operation relatively fast, it is also possible to make a document more quickly.

Next, according to the second embodiment of the present invention, the numerals, characters, and symbols on the respective keys 134 are selectively indicated as the key pad 132 is rotated. That is, the user can merely view the numerals, characters, and symbols indicated in a holographic way on the keys 134 in the range A. Further, the numerals, characters, and symbols are not indicated on the keys 134 that are not used in the normal mode.

Figure 5B:
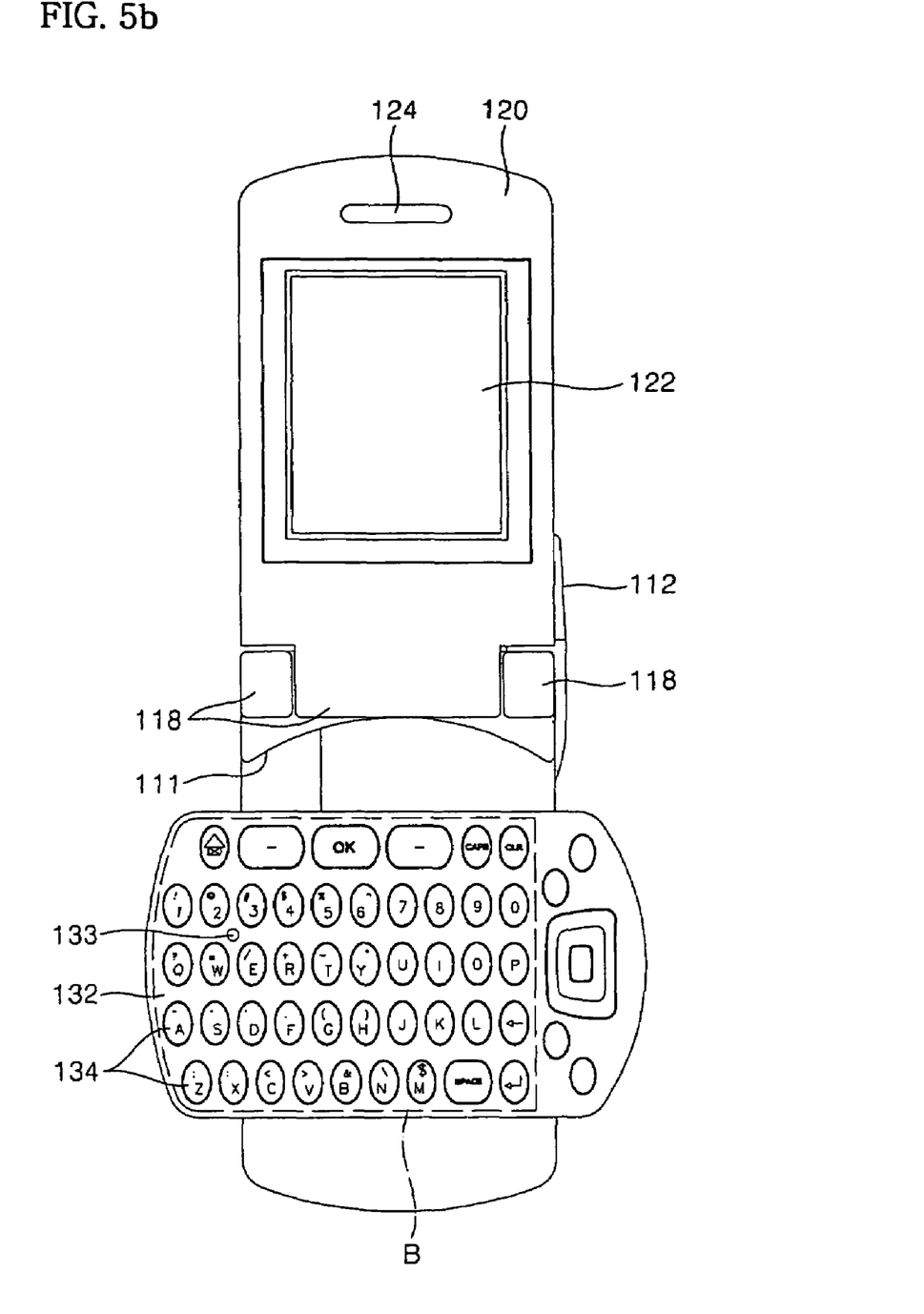

Furthermore, in a case where the numerals, characters, and symbols are indicated by the holograms, the user can view the numerals, characters, and symbols indicated in the holographic way on the keys 134 in the range B as shown in FIG. 5b when the key pad 132 has been rotated by 90 degrees with respect to the main body unit 110.

Therefore, the numerals, characters, and symbols that are not used in this mode are not indicated, and thus, the numerals, characters, and symbols which the user wishes to input can be easily located such that the key input operation can be easily performed.

Next, the operation of the third embodiment of the present invention will be described. In the present embodiment, since the card slot 236 formed in the key pad 232 faces the curved step portion 211 in the normal mode, the card slot 236 is not exposed to the outside. Therefore, it is impossible to unload the memory card 235 from the card slot 36 (→236) in the normal mode.

In the meantime, the rotational mode where the key pad 232 is rotated by 90 degrees about the pad hinge 225 is shown in FIG. 9. In such a rotational mode, since the card slot 236 is exposed to the outside, it is possible to unload the memory card 235 mounted in the card slot 236. Particularly, since the arrangement of keys 234 on the key pad 232 in the rotational mode is advantageous in making a document, it is possible to unload the memory card 235 from the card slot and easily transfer the document data.

According to the portable terminal of the present invention so configured, the following advantages can be obtained.

First, a user can rotate the key pad to change the arrangement of keys according to the modes of the portable terminal. That is, since the keys are used in a state where the key arrangement is made suitable for the characteristics of the modes used, there is an advantage in that it is possible to perform the key input operation more quickly.

Further, the key pad is configured in such a manner that it can be rotated by a predetermined angle with respect to the main body unit. Therefore, since the key pad can be rotated with respect to the main body unit to change the relative position of the key pad with respect to the display unit according to the modes of the portable terminal, there is another advantage in that it is possible to use the portable terminal suitable for each mode of the portable terminal, and thus, the convenience of the user can be enhanced.

Furthermore, since they are indicated on the keys arranged on the rotatable key pad using the holograms, the numerals, characters and symbols to be indicated on the keys are changed in accordance with the modes of the portable terminal if the inclined direction of the key surfaces is changed as the key pad rotates. Therefore, there is a further advantage in that the user can easily confirm the numerals, characters, and symbols.

Next, the card slot in which the memory card is mounted is designed to be selectively exposed to the outside. Therefore, since the user can selectively unload the memory card by exposing the card slot only when desired, a risk of losing the memory card while moving can be minimized.

Furthermore, the card slot is selectively exposed or covered as the key pad rotates. The modes of the portable terminal are changed according to the degree of the rotation of the key pad with respect to the main body unit, and the memory card can be unloaded accordingly. Therefore, it is possible to conveniently unload the memory card only when necessary, and thus, the convenience of the user can also be enhanced.

The scope of the present invention is not limited to the embodiments described and illustrated above but is defined by the appended claims. It will be apparent to those skilled in the art that various modifications and changes can be made thereto within the scope of the invention defined by the claims.

For example, although the folder type portable terminals have been described in the illustrated embodiments, a variety of bar type and slide type portable terminals in which a key pad rotates relative to a main body unit can be designed.

Furthermore, the configuration of the pad hinge for allowing the key pad to rotate relative to the main body unit is not also limited to the illustrated embodiments, and a variety of configurations for doing the same can be used. Further, the number of keys in the key pad, the arrangement of the indicated characters, and the like are not limited to the illustrated embodiments but can be designed in various ways.

In the meantime, an additional embodiment can be achieved by combining the embodiments of the present invention with one another in various ways. For example, it is conceivable that the third embodiment is combined with the first or second embodiment.

What is claimed is:

1. A portable terminal, comprising:
a main body;
a display provided with the main body and including a screen for displaying a variety of information;
a key pad separate from and rotatably coupled to the main body, the key pad including a plurality of keys arranged in rows thereon;
a pad hinge that rotatably couples the key pad to an upper surface of the main body such that the key pad is rotatable by a predetermined angle relative to the main body, wherein rotation of the key pad relative to the main body about the pad hinge automatically switches the portable terminal from a first mode to a second mode, and wherein the plurality of keys functions in the first mode when a longitudinal direction of the key pad is oriented substantially parallel to a longitudinal direction of the main body, and the plurality of keys functions in the second mode when the longitudinal direction of the key pad is oriented substantially perpendicular to the longitudinal direction of the main body;

a card slot formed in a side of the key pad and configured to receive a memory card therein, wherein the card slot is exposed in the second mode and is hidden in the first mode such that the card slot is configured to receive the memory card therein and unload the memory card therefrom only in the second mode; and a curved step portion formed on the upper surface of the main body and having a curvature corresponding to a rotating radius of the keypad, wherein an end of the key pad has a curvature corresponding to the curved step portion, and wherein the card slot is positioned facing the curved step portion in the first mode such that the card slot is hidden.

2. The portable terminal as claimed in claim 1, wherein the pad hinge provides for rotation of the key pad of about 90 degrees relative to the main body in at least one direction.

3. The portable terminal as claimed in claim 2, wherein the pad hinge comprises:

a first hinge body having a mounting piece mounted to one of the main body or the key pad;

a second hinge body having a mounting flange mounted to the other of the main body or the key pad, the second hinge body being rotatably coupled to the first hinge body; and a through-hole that extends through a central portion of at least one of the first hinge body or the second hinge body to allow a cable to pass therethrough for connection between the main body and the key pad.

4. The portable terminal as claimed in claim 3, wherein the first hinge body and the second hinge body share a common central axis that is substantially orthogonal to mating lateral surfaces of the main body and the key pad.

5. The portable terminal as claimed in claim 1, wherein information inputted through the plurality of keys is switched by a signal generated by a sensor that detects a rotational position of the key pad relative to the main body.

6. The portable terminal as claimed in claim 1, wherein the key pad is positioned between the display and the main body when the display is folded onto the main body.

7. The portable terminal as claimed in claim 1, wherein characters, numerals and symbols are indicated on the plurality of keys using holograms.

8. The portable terminal as claimed in claim 7, wherein surfaces of the plurality of keys are inclined in one direction.

9. The portable terminal as claimed in claim 8, wherein the characters, numerals and symbols are indicated on the plurality of keys such that their upper ends are directed toward a lower side of the screen of the display.

10. The portable terminal as claimed in claim 1, wherein the card slot is configured to receive an SD card therein.

11. The portable terminal as claimed in claim 1, wherein a first subset of the plurality of keys are activated in the first mode, and a second subset of the plurality of keys are activated in the second mode, the first subset of keys being different from the second subset of keys.

12. The portable terminal as claimed in claim 11, wherein information displayed on the plurality of keys in the first mode is different than information displayed on the plurality of keys in the second mode.

13. The portable terminal as claimed in claim 11, wherein an orientation of characters displayed on the first subset of keys in the first mode is different than an orientation of characters displayed on the second subset of keys in the second mode.

\* \* \* \* \*